United States Patent
Covino et al.

[11] Patent Number: 5,817,267
[45] Date of Patent: Oct. 6, 1998

[54] FABRICATION OF TOOLING BY THERMAL SPRAYING

[75] Inventors: Charles P. Covino, Mendham; Edmund V. Aversenti, Chester, both of N.J.; Gaylon Pleasant, Arlington; Allen Solomon, Grand Prairie, both of Tex.

[73] Assignee: General Magnaplate Corporation, Linden, N.J.

[21] Appl. No.: 748,580

[22] Filed: Nov. 13, 1996

Related U.S. Application Data

[60] Provisional application No. 60/006,666 Nov. 13, 1995.

[51] Int. Cl.$^6$ .............................. B29C 33/38; C23C 4/12
[52] U.S. Cl. ............................. 264/219; 164/46; 164/98
[58] Field of Search ............................. 164/46, 98, 138, 164/72; 264/219

[56] References Cited

U.S. PATENT DOCUMENTS

| | | | |
|---|---|---|---|
| 1,528,581 | 3/1925 | Steenstrup . | |
| 1,813,880 | 7/1931 | Kraft . | |
| 1,935,916 | 11/1933 | Ragsdale | 76/107 |
| 2,281,634 | 5/1942 | Stossel | 22/200 |
| 2,344,960 | 3/1944 | Beal | 18/41 |
| 2,629,907 | 3/1953 | Hugger | 22/200 |
| 3,009,209 | 11/1961 | Weinbrenner et al. . | |
| 3,018,520 | 1/1962 | Renaud | 18/48 |
| 3,053,610 | 9/1962 | Schichman | 18/47 |
| 3,182,361 | 5/1965 | Trimble | 22/193 |
| 3,183,289 | 5/1965 | Leavesley, Jr. | 264/220 |
| 3,336,181 | 8/1967 | Falkenau et al. | 161/89 |
| 3,638,299 | 2/1972 | Garner et al. | 29/527.2 |
| 3,784,451 | 1/1974 | Garner | 204/20 |
| 4,224,356 | 9/1980 | Singer | 427/34 |

(List continued on next page.)

OTHER PUBLICATIONS

Thorpe et al., "Spray Metal Composite Tooling," 26th National SAMPE Symposium, Apr. 28–30, 1981 (pp. 374–387).

Thorpe et al., "Progress Report: Large Sprayed Metal Composite Tooling," 27th National SAMPE Symposium, May 4–6, 1982, (pp. 854–864).

Scott A. Martyniak, "Prototype and Limited Production, Spray Metal Tools for Injection and Blow Molding," Technical Paper PE 93–165, Society of Manufacturing Engineers, 1993.

Dimitrije Milovich, "Metal–Faced Composite Tooling," paper TE–89–507, Society of Manufacturing Engineers, 1989.

Milovich et al., "Fabrication and Analysis of Invar–Faced Composites for Tooling Applications," SME Conference: Tooling for Composites '93, Jan. 18–19, 1993, Pasadena, California.

*Primary Examiner*—Jan H. Silbaugh
*Assistant Examiner*—Suzanne E. Mason
*Attorney, Agent, or Firm*—Lerner, David, Littenberg, Krumholz & Mentlik

[57] ABSTRACT

A method for fabricating a mold by providing a matrix having a shape to be molded, and spraying molten metal from a spray gun. The spray gun is moved so that the spray gun makes successive passes over the surface of the matrix in a movement direction, shifts in a step direction transverse to the movement direction between passes and turns between passes so that during at least some successive passes metal is deposited from two spray directions in a crisscross pattern. Metal is deposited on the matrix, forming a shell which is removed from the matrix and used as a mold.

25 Claims, 1 Drawing Sheet

U.S. PATENT DOCUMENTS

| | | | |
|---|---|---|---|
| 4,231,982 | 11/1980 | Jansson | 264/112 |
| 4,374,173 | 2/1983 | Adamovic | 428/325 |
| 4,505,947 | 3/1985 | Vukanovic et al. | 427/34 |
| 4,776,076 | 10/1988 | Frank et al. | 29/156.8 R |
| 4,777,002 | 10/1988 | Putz | 264/226 |
| 4,971,846 | 11/1990 | Lundy | 428/35.8 |
| 4,990,205 | 2/1991 | Barbier et al. | 156/242 |
| 5,042,968 | 8/1991 | Fecto | 416/226 |
| 5,073,589 | 12/1991 | Milovich et al. | 524/439 |
| 5,104,293 | 4/1992 | Eaton, Jr. et al. | 416/241 B |
| 5,123,814 | 6/1992 | Burdick et al. | 416/224 |
| 5,189,781 | 3/1993 | Weiss et al. | 29/427.2 |
| 5,217,747 | 6/1993 | Tsantrizos et al. | 427/455 |
| 5,229,165 | 7/1993 | Das et al. | 427/456 |
| 5,269,658 | 12/1993 | Carlson et al. | 416/229 R |
| 5,358,753 | 10/1994 | Rao et al. | 427/451 |
| 5,362,523 | 11/1994 | Gorynin et al. | 427/446 |
| 5,433,002 | 7/1995 | Nadolink | 29/889.6 |
| 5,440,798 | 8/1995 | Weymouth, Jr. | 29/527.6 R |
| 5,449,483 | 9/1995 | Greenwood et al. | 264/155 |

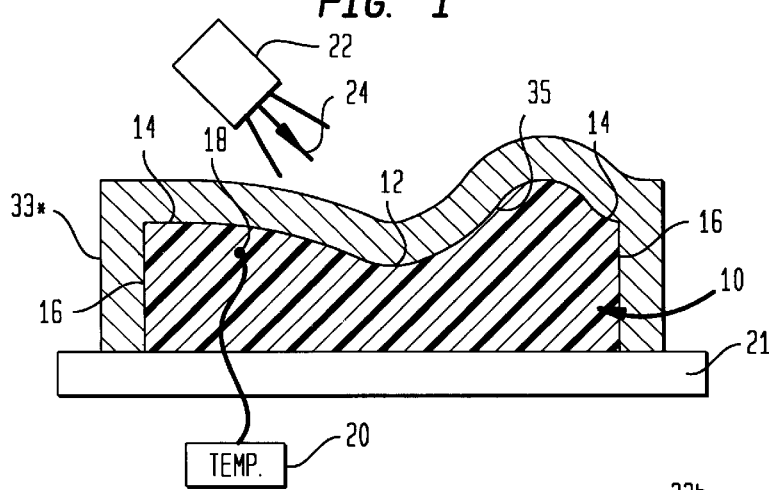
FIG. 1
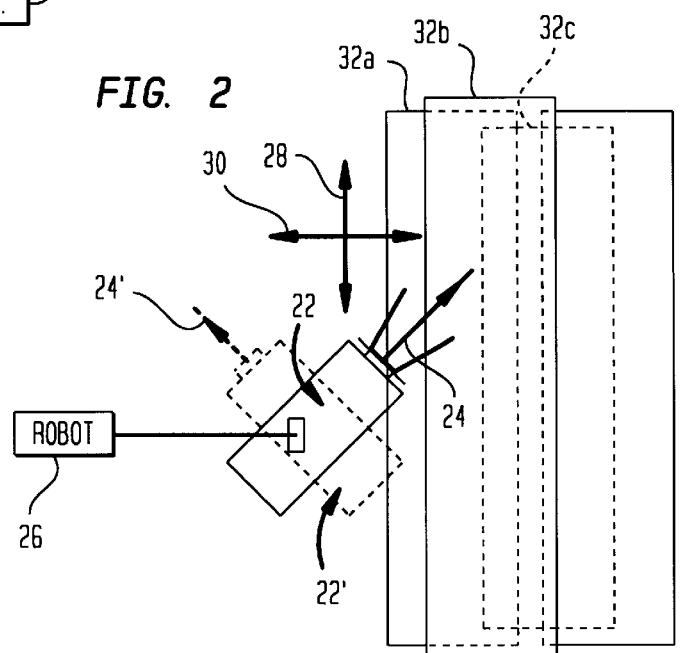
FIG. 2
FIG. 3
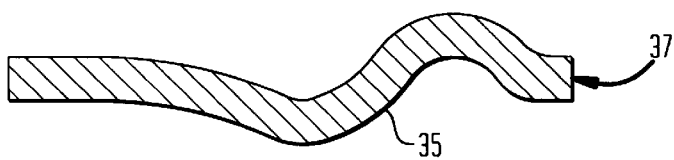
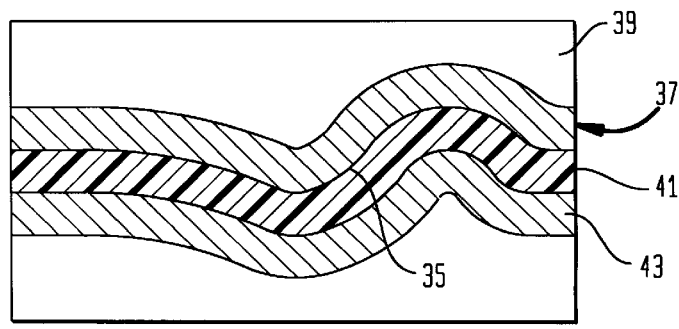
FIG. 4

FABRICATION OF TOOLING BY THERMAL SPRAYING

CROSS REFERENCE TO RELATED APPLICATIONS

The present application claims benefit of U.S. Provisional Application No. 60/006,666, filed Nov. 13, 1995, the disclosure of which is hereby incorporated by reference herein.

BACKGROUND OF THE INVENTION

The present invention relates to the art of fabricating tools by thermal spraying of metals.

Industrial processes such as molding and layup of composite materials require tools having shapes specific to the article to be made. For example, a composite article can be formed in a mold having an internal shape corresponding to she shape of the desired article. Tools for fabrication of small parts are often machined from solid metals, using conventional machining techniques. These techniques are impractical in the case of very large molds, having dimensions of a meter or more. There has been an increasing need for large molds in many industries, and particularly in the aerospace industries, with the increasing prevalence of composite structural materials in airframes. Composite parts used in the airframes must meet exacting standards for fit and finish and often incorporate complex curved surfaces. Moreover, certain particularly useful composites, such as carbon-fiber reinforced graphite composites, must be molded at relatively high temperatures. Molds formed from nickel alloys having low coefficients of thermal expansion are preferred for molding these materials. The cost of machining very large molds from solid blocks of these metals is prohibitive.

Various proposals have been advanced for forming tools by providing a matrix having a shape corresponding to that of the part and then depositing metal on the matrix to form the tool. For example, tools can be made by a process known as electroforming, in which the metal forming the tool is electroplated onto the matrix until a sufficient thickness of metal has been built up. Electroforming is slow and expensive and impractical for very large tools. Moreover, many metals which are useful for tooling, such as stainless steel and certain nickel-containing alloys cannot be electroformed readily.

It has also been proposed to fabricate tools by thermal spraying of metals onto the matrix. As used in this disclosure, the term "thermal spraying" refers to a process in which a metal is heated to convert it to droplets of molten metal; the droplets are sprayed onto a solid matrix and the deposited droplets solidify. Examples of thermal spraying include flame spraying in which the metal is melted to form the droplets by passing it through a flame; arc spraying, in which the metal is melted by passage through an electrical arc and plasma spraying, in which the metal is melted by contact with a hot plasma. The article Spray Metal Composite Tooling by Thorp et al., 26th National SAMPE Symposium, Apr. 28–30, 1981 (pp. 374–387) and Progress Report: Large Sprayed Metal Composite Tooling also by Thorp et al., 27th National SAMPE Symposium, 1982, (pp. 854–864) describe formation of tools for making large fiber glass-epoxy composite articles by spraying a relatively low-melting metal known as kirksite onto a plastic-coated plaster mandrel and then applying a honeycomb composite backing on the outside of the sprayed kirksite and removing the mandrel. Martyniak, Prototype and Limited Production, Spray Metal Tools for Injection and Blow Molding, Technical Paper PE 93–165, Society of Manufacturing Engineers, 1993 describes formation of plastics molds by spraying zinc onto a matrix and backing the sprayed zinc shell with an epoxy for structural reinforcement. Garner, U.S. Pat. No. 3,784,451 discloses a process for making a sprayed metal mold such as a sprayed zinc mold in which the sprayed metal shell such as a zinc or aluminum shell is impregnated with a polymeric resin and electroplated to provide a smooth surface. U.S. Pat. No. 5,189,781 discloses fabrication of a matrix for thermal spraying by computer-driven solid modeling techniques. Here again, however, the sprayed metal is a relatively low-melting material such as an alloyed zinc composition. Putz, U.S. Pat. No. 4,777,002 discloses a further process for making a mold by spraying steel onto a mold core which has first been coated with a water soluble separating layer; applying a backing to the sprayed layer of steel and then separating the backing and steel layer by dissolving the water soluble layer.

Milovich et al., U.S. Pat. No. 5,073,589 describes a backing resin for a sprayed metal tool to be used at temperatures up to about 750° C. The backing resin composition is placed on the rear surface of a metal shell. The metal shell is formed by spraying a matrix or pattern with metals such as tin, zinc, aluminum or steel alloys. Milovich, Metal-Faced Composite Tooling, paper TE-89-507, Society of Manufacturing Engineers, 1989 notes that "spray metal tooling" has been tried in one form or another "by virtually every aerospace manufacturer over the last forty years" and further notes that "the lack of success, and consequent industry non-acceptance has generally been attributed to poor basic material properties rather than the insufficient material and processing development that has characterized this little known field." The paper goes on to report measurements of the coefficients of thermal expansion of various metals ranging from a tin/zinc alloy (melt temperature of 455° F.), to nickel alloys (melt temperatures approximately 2700° F.), and further reports fabrication of demonstration tools from aluminum bronze. Milovich, Fabrication and Analysis of Invar/Faced Composites for Tooling Applications, SME Conference: Tooling for Composites 93, Jan. 18–19, 1993, Pasadena, Calif., reports the fabrication of thin test plates of a nickel alloy referred to as Invar by thermal spraying of the alloy onto a monolithic graphite matrix. The reference notes that the Invar must be made thin to reduce dimensional changes caused by shrinkage of the Invar after thermal spraying.

Despite these and other efforts in the art, however, prior to the present invention, it has not been practical to provide tools suitable for fabrication of large, composite articles at high molding temperatures by thermal spraying of metals. In particular, no truly satisfactory method of tool fabrication has been found for fabrication of large, relatively thick shells having the strength characteristics required for formation of large composite parts such as those employed in the aerospace industry. Moreover, it has been particularly difficult to form such large, thick shells in metals having relatively high melting points such as stainless steel and nickel alloys. Thus, prior to the present invention there have been significant, unmet needs for further improvement in techniques of fabricating tools by thermal spraying of metals and there have been corresponding needs for improvements in the tools themselves.

SUMMARY OF THE INVENTION

One aspect of the present invention provides methods of making molds. A preferred method in accordance with this aspect of the invention includes the step of providing a matrix having a shape to be molded. The matrix may be formed from any convenient material, such as a readily machinable polymeric composition or a castable, multicomponent polymeric composition. Methods according to this aspect of the invention further include the step of depositing a metal on the matrix by spraying the metal in molten form from a spray gun while moving the spray gun relative to the matrix so that the spray gun passes back and forth over the matrix in a movement direction. The spray gun shifts in a step direction transverse to the movement direction between passes. The molten metal is ejected from the spray gun in a spray direction. Most preferably, the method includes the step of turning the gun between passes so as to change the spray direction. The motion of the spray gun relative to the matrix is controlled so that metal is deposited in overlapping regions during successive passes. Thus, during at least some of the successive passes, metal is deposited in the same region of the matrix from two spray directions in a crisscross pattern. The deposited metal forms a shell on the matrix. After deposition, the shell is removed from the matrix.

Preferred processes according to this aspect of the present invention can form robust, thick metal shells of essentially any desired size which accurately reproduce the shape of the matrix. These shells can be used as molds for making a wide variety of articles. Although the present invention can be used to make essentially any size or thickness of shell desired, it is particularly useful in forming relatively thick, self-supporting shells, desirably more than about 3 mm thick and more preferably about 8 mm thick or more. Also, the preferred processes according to the present invention are particularly useful in forming large shells having length and width dimensions of about 0.5 mm or more and encompassing an area of at least about one square meter. Preferred methods according to this aspect of the present invention can be used to fabricate molds from essentially any metal. However, they are particularly useful in fabricating molds from metals having melting points above about 400° C. and metals having substantially higher melting points, such as above about 1000° C. can also be formed into molds using the process. Metals including one or more constituent metals selected from the group consisting of iron, nickel, zinc, aluminum and copper can be employed.

Particularly preferred applications for the process include fabrication of molds from stainless steels and from nickel alloys such as nickel-iron alloys. For example, a nickel-iron alloy containing about 30% to about 55%, and more preferably about 36% to about 50% nickel, have low coefficients of thermal expansion and are particularly desirable materials for large molds to be used at high temperatures. It has not been practical heretofore to fabricate large, thick, robust molds from these materials heretofore by thermal spraying. Although the present invention is not limited by any theory of operation, it is believed that the particular techniques used in the spraying step, including the crisscross overlapping spray pattern provide enhanced resistance to warpage and distortion of the sprayed metal shell.

The process may include application of the sprayed metal in two or more stages, most preferably three stages. In the first and third stages, the sprayed metal is applied relatively slowly with relatively low power dissipation in the thermal spray gun and relatively low speed of motion of the spray gun over the matrix. In the second stage, the sprayed metal is applied at a higher rate, with high power dissipation in the spray gun and more rapid motion of the spray gun over the surface. The conditions used during the first stage provide for fine replication of the surface contours and formation of a dense metal layer adjacent the matrix without overheating the matrix. The conditions used in the second stage provide for rapid buildup of metal to form the thick, robust shell. The shell can be made into a "wickable" or "non-wickable" mold as desired. As used in this disclosure with reference to a mold component, the term "wickable" means that the component has sufficient permeability to gases to dissipate volatiles evolved in a molding operation, whereas the term "non-wickable" means that the shell lacks this degree of gas permeability. To render the shells non-wickable, the shells may be impregnated with polymeric materials or with metals such as nickel alloys which can be applied by electroless plating or by electroplating. Alternatively or additionally, the shells can be impregnated with polymeric materials such as the homopolymers and copolymers of monomers selected from the group consisting of tetrafluoroethylene, fluorinated ethylene propylene, perfluoroalkoxyethylene, acrylics, vinylidene fluorides and amides.

A further aspect of the present invention provides metallic shells formed from spray deposited metals having combinations of properties not heretofore obtainable in spray deposited metal shells. Preferred shells according to this aspect of the invention include those having length and width dimensions of at least about 0.5 meters; having thickness of at least about 3 mm and being formed from a spray deposited metal having a melting temperature of at least about 500° C. and more preferably at least about 1000° C.

BRIEF DESCRIPTION OF THE DRAWINGS

FIG. 1 is a diagrammatic sectional view depicting a matrix and shell used in one embodiment of the invention.

FIG. 2 is a diagram depicting spray gun motion and spray coverage in the embodiment of FIG. 1.

FIG. 3 is a diagrammatic view of the shell formed in accordance with the embodiments of FIGS. 1–2.

FIG. 4 is diagrammatic view depicting the shell of FIG. 3 in a molding operation.

DETAILED DESCRIPTION OF THE PREFERRED EMBODIMENTS

A process in accordance with one embodiment of the invention utilizes a matrix 10 having a cavity region 12 depicting the shape of the part to be molded. Matrix 10 further includes edge regions 14 bounding cavity region 12 and side walls 16 projecting from edge regions 14 and cavity region 12. Side walls 16 have draft angles, most desirably about 3°–5° or more. Preferably, edge regions 14 are about two inches (5 cm) wide or more. Matrix 10 desirably is formed from a material having useful structural strength up to about 220° F. (104° C.) or more. High temperature epoxy composite tooling compounds, such as those sold under the designation EL-325HTTC epoxy composite tooling compounds by Adtech Corporation of Charlotte, Mich. can be employed. Such epoxies are provided commercially as two component systems which can be mixed and then cast to shape and cured. Alternatively, the mixture can be cast into a block and then machined to the desired shape. Other suitable materials are sold under the trademark REN SHAPE by the Ciba-Geigy Corporation of Ardsley, N.Y. and by Ren Plastics, Inc. of Lansing, Mich. The REN SHAPE material commonly is provided as boards or prefabricated shapes which can be machined to the desired shape for the mold. Other readily formable or machinable materials including metals such as aluminum or brass or graphite may be employed. The desired shape for the cavity region may be provided as computer data and the matrix may be machined to shape using a conventional computer controlled machine tools. Polymeric materials such as the epoxy materials mentioned above can be reinforced with conventional fibrous reinforcements.

A temperature sensitive probe 18 such as a thermocouple is embedded in matrix 10 in the cavity region, adjacent the surface of the mold. The temperature sensitive probe is linked to a conventional readout device 20 so that the operator can monitor the temperature of the matrix surface during the process to follow. Matrix 10 desirably is held and stabilized on a supporting structure such as a stainless steel table 21.

A thermal spray gun 22 linked to a robot 24 (FIG. 2) is used to apply the sprayed metal. Thermal spray gun 22 may be a conventional plasma spray gun or arc spray gun. For example, a spray gun of the type sold under the designation model BP 400 Arc Spray System by Miller Thermal, Inc. of Appleton, Wis. The BP 400 Gun is arranged to advance a pair of wires continually while applying an electrical potential to strike an arc between the wires. The wires continually melt and the molten metal is atomized and blown onto the substrate by a stream of compressed gas such as a stream of compressed air. The spray gun is equipped with a high velocity air cap arranged to direct the spray of metal droplets and gas at a high velocity in a relatively narrow, cone-shaped pattern directed generally along a spray direction 24 extending from the front of the gun.

Spray gun 22 is mounted on a conventional industrial robot 26 which is programmable using conventional techniques. Robot 26 is programmed to move the gun in the manner discussed below. Gun 22 is also connected to a source of the wire to be employed in the process (not shown) as well as a source of compressed gas, such as compressed air, for ejecting the droplets. The wire used by gun 22 has the same composition as the desired metallic shell. Among the metals which can be used are aluminum alloys such as those in the 2000; 3000; 5000; 6000 or 7000 series of aluminum alloys. A wide range of ferrous metals including stainless steels can also be used. Among the stainless steel alloys which can be successfully employed are types 303, 304, 415, and 15.5. As mentioned above, certain iron-nickel alloys are particularly useful to provide finished molds with very low thermal expansion coefficients. Alloys of iron and nickel having between about 30% and about 55% nickel, and between about 45% and about 70% iron are particularly preferred for this purpose. The most preferred alloys include alloys containing about 36% nickel. Among these alloys are those sold under the designations "nickel 36" by the aforementioned Miller Thermal, Inc. and the material referred to as Invar 36. Nickel containing alloy of the type sold under the designation Nilo 36 Filler material, by INCO Alloys International of Huntington, W. Va. can also be employed. The Nilo filler material contains approximately about 36.29% nickel, 61.47% Fe; 1.14% Co; 0.26% Ti; 0.09% Si; 0.52% Mn and 0.23% C. The alloy referred to as Nilo 36 metal core, containing about 40.72% Ni and 58% Fe, available from the aforementioned INCO Alloys International may also be employed. Also, the 50% nickel—50% Invar alloy may be employed.

Prior to application of the metal, the surfaces of matrix 10 may be coated with a suitable sealant such as an epoxy hi-temperature surface coat available from the aforementioned AdTech Corporation. In the metal depositing process, robot 26 sweeps gun 22 over the surface of matrix 10 so that the gun moves in a movement direction indicated by double headed arrow 28 (FIG. 2) during each pass and shifts in a step direction 30 between passes. Robot 26 maintains the spray outlet of the gun at a preselected standoff distance from the surface of matrix 10. The robot also turns gun 22 so as to turn the spray direction relative to the movement direction in alternate passes. Thus, in one set of passes, the gun is directed as indicated in solid lines at 22 in FIG. 2, and the spray direction is the first spray direction 24. In another set of passes interspersed with the first set, the gun is positioned as indicated in broken lines at 22' in FIG. 2 and the spray direction is the second spray direction 24'. All of these motions are coordinated with one another so that the sprayed metal impinging on the surface of matrix 10 is deposited in a series of overlapping strips. For example, in a first pass, with gun 22 oriented as indicated in solid lines, and with the sprayed metal directed in the first spray direction 24, the metal impinges on matrix 10 in a strip 32a as the gun sweeps in the movement direction towards the top of the drawing in FIG. 2. In the next pass, the spray direction is the second spray direction 24', the gun moves in the opposite movement direction, towards the bottom of the drawing as seen in FIG. 2, and the sprayed metal impinges on the matrix in a strip 32b overlapping strip 32a. This process continues, so that the next pass uses the first spray direction 24 and covers strip 32c overlapping strip 32b and so on. In each pass, the deposited metal covers about one half of the width of the strip covered in the preceding pass. The speed of the gun movement typically is between 1200 and 2600 inches per minute.

As this process continues, metal is deposited in the two spray directions 24 and 24' in a crisscross pattern. This pattern of operation is repeated over the entire surface of cavity region 12 and edge region 14 and extends onto side walls so that the deposited metal extends onto all of these regions. The deposited metal forms a shell 37 with a cavity surface 35 facing toward the matrix and duplicating the shape of the matrix. The shell also has ribs 33 extending over the side walls of the matrix and projecting from surface 35. During the spray process, temperature monitoring sensor 18 and indicator 20 are used to check the temperature of the matrix. The spray conditions are controlled so that the temperature of the matrix does not exceed the service temperature of the matrix and preferably remains below about 200° F. (95° C.).

The spraying process is performed in three stages. In the first stage, a first set of spray conditions are employed. The first spray conditions include a first, relatively low level of power dissipation in the arc of the spray gun and hence a relatively low rate of metal deposition as well as a first, relatively low linear speed of in movement direction 28 and low rate of wire feed to the gun. These first-stage conditions are maintained until a predetermined thickness of metal has been built up on the matrix, typically about 0.030–0.060 inches (about 0.75 mm to about 1.5 mm). The second stage uses a higher power dissipation, higher wire feed rate and greater movement speed than the first stage. The conditions used in the third stage desirably are similar to those used in the first stage but with relatively high power dissipation. The first-stage conditions produce a fine, dense metal coating on the matrix surface whereas the second stage conditions promote rapid buildup of deposited metal. Although particular spray conditions will vary somewhat with the particular spray gun used and also with the metal being deposited, the following conditions have been found satisfactory for deposition of 36% nickel—64% iron alloys:

| STAGE | ARC VOLTAGE | ARC AMPERES | STAND-OFF DIST. | MOVEMENT SPEED PER MINUTE | WIRE FEED RATE |
| --- | --- | --- | --- | --- | --- |
| FIRST | 25 | 15 | 4–6 inches (10–15 cm) | 1200 inches (30 m) | <31 Ft/min (<10 m/min) |
| SECOND | 35 | 40 | 4–6 inches (10–15 cm) | 2100 inches (53 m) | >31 Ft/min (>10 m/min) |
| THIRD | 34 | 90 | 4–6 inches (10–15 cm) | 1800 inches (46 m) | <31 Ft/min (<10 m/min) |

Deposition under the second stage conditions is continued until almost all of the desired thickness has been built up. Shells of essentially any thickness can be made by continuing the deposition for the desired time. Preferably, the thickness of the shell is built up to about at least 3 mm, more preferably at least about 8 mm, and most preferably up to about 13 mm (½ inch) during the deposition process.

After completion of the deposition, the deposited metal shell is allowed to cool gradually, desirably over a period of at least several hours and more preferably over a longer time before being removed from the matrix. For example, cooling from about 150° C. to about 20° C. over a period of two to six weeks in a control-temperature environment, followed by several days additional cooling at room temperature is particularly preferred in the case of very large molds. It is believed that the gradual cooling tends to stabilize the metal shell and prevent warpage when the shell is removed. Also, although the present invention is not limited by any theory of operation, it is believed that the presence of the integral metal 33 projecting from the cavity surface 35 of the mold along the wall surfaces 16 of the matrix further stabilizes the metal shell against warpage during and immediately after cooling. After the shell is removed from the matrix, ribs 33 are removed to leave the shell in the form it will have as a final mold. The cavity surface 35 of the shell, which was originally in contact with matrix 10, faithfully replicates the shape of the matrix and has a good surface finish. Preferably, the surface finish is enhanced by polishing, typically to a finish of about 125 microinches surface roughness or smoother. After polishing, the molding surfaces may be impregnated with a polymer or with a metal such as nickel by electroplating or by electroless plating. Suitable polymeric coatings include homopolymers and copolymers of monomers selected from the group consisting of tetrafluoroethylene, fluorinated ethylene propylene, perfluoroalkoxyethylene, acrylics vinylidene fluorides and amides. These can be applied by conventional coating and impregnation techniques. Among the polymeric materials which can be employed are the synergistic coatings sold under the registered trademark LECTROFLUOR, by General Magnaplate Corporation of Linden, N.J. Where a non-wickable mold is desired, the completed, impregnated sell should pass a vacuum integrity test.

The completed shell typically has sufficient structural strength to serve as a mold. However, for additional structural strength the shell can be reinforced, as by casting or laying up a polymeric reinforcement 39 on the surface of the shell 37 opposite from the cavity surface 35. Reinforcement 39 may incorporate additional metallic elements, or else may incorporate a honeycomb or other reinforcing structure within the cast or laid up polymer. The reinforcing structure may also include elements such as cooling and heating tubes for cooling or heating the shell in surface. In a variant of the process, cooling and heating tubes, solid metal reinforcing elements and other metallic inclusions may be embedded in the shell during the metal deposition process. Thus, such inclusions may be placed on the partially completed shell so that additional layers of metal are built up over the inclusions.

The completed mold may be used to form a composite articles such as the article 41. The mold may be used with a matching mold 43 formed by a similar process. Molds fabricated according to the foregoing process can be used to form essentially any material. However, they are particularly useful in formation of carbon fiber and graphite composites. Such composites are used in the aerospace industry to form airframe structures. Such composites commonly are cured at temperatures of about 350° F. (177° C.). Nickel alloy molds fabricated as described above can be used to form these materials even in very large pieces, having dimensions of several meters or even tens of meters.

The metallic shells formed in accordance with the procedures discussed above can be used for purposes other than molding.

As these and other variations and combinations of the features described above can be utilized without departing from the present invention, the foregoing description of the preferred embodiments should be taken by way of illustration rather than by way of limitation of the invention as defined by the claims.

We claim:

1. A method of making a mold comprising the steps of;
   (a) providing a matrix having a shape to be molded;
   (b) depositing a metal on said matrix by spraying the metal as molten droplets from a spray gun while moving the spray gun relative to the matrix so that the spray gun passes back and forth over the surface of the matrix in a movement direction and shifts in a step direction transverse to the movement direction between passes, while the metal is ejected from the spray gun in a spray direction and turning the gun between passes as to change the spray direction between passes so that during at least some successive passes, metal is deposited in the same region of said matrix from two spray directions in a crisscross pattern, whereby the deposited metal forms a shell on the matrix; and
   (c) removing the shell from the matrix to form a mold.

2. A method as claimed in claim 1 wherein said shell is at least about 3 mm thick.

3. A method as claimed in claim 2 wherein said shell has length and width dimensions of at least about 0.5 m.

4. A method as claimed in claim 3 wherein said shell is at least about 8 mm thick.

5. A method as claimed in claim 4 wherein said shell encompasses an area of at least about 1 m$^2$.

6. A method as claimed in any of claims 1–5 wherein said metal has a melting temperature of at least about 400° C.

7. A method as claimed in any of claims 1–5 wherein said metal has a melting temperature of at least about 1000° C.

8. A method as claimed in claim 6 wherein said metal includes at least about 50% of one or more constituent metals selected from the group consisting of iron, nickel, zinc, aluminum and copper.

9. A method as claimed in claim 6 wherein said metal includes at least about 50% of one or more constituent metals selected from the group consisting of iron and nickel.

10. A method as claimed in claim 9 wherein said metal includes at least about 10% nickel.

11. A method as claimed in claim 10 wherein said metal includes between about 30% and about 55% nickel, and between about 45% and about 70% iron.

12. A method as claimed in any of claims 1–5 further comprising the step of sealing said shell by impregnating the shell.

13. A method as claimed in claim 12 wherein said step of impregnating said shell includes the step of impregnating the shell with a polymeric material.

14. A method as claimed in claim 12 wherein said step of impregnating said shell includes the step of plating a metal onto said shell.

15. A method as claimed in claim 1 wherein said step of spraying said metal is conducted while maintaining said matrix at a surface temperature below about 95° C.

16. A method as claimed in claim 15 wherein said matrix is formed from a polymeric material.

17. A method as claimed in claim 1 wherein said step of spraying said metal as molten droplets is performed by arc-spraying said metal.

18. A method as claimed in claim 1 wherein said step of spraying said metal as molten droplets is performed by plasma-spraying said metal.

19. A method as claimed in claim 1 wherein said depositing step includes a first stage using a first set of conditions so as to deposit an initial layer of said metal on said matrix and a second stage using a second set of conditions different than said first set so as to deposit the remainder of said shell.

20. A method as claimed in claim 19 wherein said second set of conditions includes higher power dissipation than said first set of conditions.

21. A method as claimed in claim 19 wherein the speed of motion of said spray gun over said surface during said second stage is greater than the speed of motion of said spray gun over said surface during said first stage.

22. A method as claimed in claim 19 wherein said depositing stage includes a third stage performed under said first set of conditions after said second stage.

23. A method as claimed in claim 1 or claim 19 further comprising the step of gradually cooling the shell after said depositing step.

24. A method as claimed in claim 23 wherein said depositing step is performed so as to form a cavity surface having the shape of the matrix and a plurality of ribs projecting from said cavity surface, the method further comprising the step of removing said ribs after said gradual cooling step.

25. A method as claimed in claim 1 further comprising the step of forming a composite part in said mold.

* * * * *

UNITED STATES PATENT AND TRADEMARK OFFICE
CERTIFICATE OF CORRECTION

PATENT NO. : 5,817,267
DATED : October 6, 1998
INVENTOR(S) : Covino et al.

It is certified that error appears in the above-identified patent and that said Letters Patent is hereby corrected as shown below:

Column 1, line 18, "she shape" should read --the shape--.

Column 7, line 56, "sell" should read --shell--.

Column 8, line 36, "dther" should read --other--.

Signed and Sealed this

Fifteenth Day of June, 1999

Attest:

Q. TODD DICKINSON

Attesting Officer     Acting Commissioner of Patents and Trademarks